(12) United States Patent
Ishida

(10) Patent No.: US 8,881,782 B2
(45) Date of Patent: Nov. 11, 2014

(54) PNEUMATIC TIRE

(75) Inventor: Masahiro Ishida, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 346 days.

(21) Appl. No.: 13/352,638

(22) Filed: Jan. 18, 2012

(65) Prior Publication Data

US 2012/0273103 A1    Nov. 1, 2012

(30) Foreign Application Priority Data

Apr. 27, 2011   (JP) ................................. 2011-099625

(51) Int. Cl.
*B60C 11/12*  (2006.01)
*B60C 11/04*  (2006.01)
*B60C 11/03*  (2006.01)
*B60C 19/00*  (2006.01)

(52) U.S. Cl.
CPC ........... *B60C 11/0306* (2013.04); *B60C 19/002* (2013.04); *B60C 2011/0381* (2013.04); *B60C 11/1236* (2013.04); *B60C 2011/039* (2013.04); *B60C 2011/0395* (2013.04); *B60C 11/0304* (2013.04); *B60C 11/04* (2013.04); *B60C 2011/0388* (2013.04); *B60C 2011/0341* (2013.04); *Y10S 152/03* (2013.01)
USPC ............... 152/209.8; 152/209.18; 152/DIG. 3

(58) Field of Classification Search
USPC ................... 152/209.2, 209.3, 209.8, 209.18, 152/209.27, DIG. 3
See application file for complete search history.

(56) References Cited

U.S. PATENT DOCUMENTS

| | | | | | |
|---|---|---|---|---|---|
| 2,121,955 | A | * | 6/1938 | Eger | 152/209.18 |
| 5,849,119 | A | * | 12/1998 | Ishida et al. | 152/209.1 |
| 7,631,675 | B2 | * | 12/2009 | Ikegami | 152/209.2 |
| 2006/0137791 | A1 | * | 6/2006 | Miyabe et al. | 152/209.18 |
| 2007/0051448 | A1 | * | 3/2007 | Yumii | 152/209.18 |

FOREIGN PATENT DOCUMENTS

| | | | |
|---|---|---|---|
| JP | 07-290909 | * | 11/1995 |
| JP | 2004-017863 | * | 1/2004 |
| JP | 2004-262312 | | 9/2004 |
| JP | 2005-029076 | | 2/2005 |
| JP | 2005-162145 | | 6/2005 |
| JP | 2007-237816 | * | 9/2007 |
| JP | 2009-143327 | | 7/2009 |
| WO | WO 2007-072824 | | 6/2007 |

OTHER PUBLICATIONS

English machine translation of JP07-290909, dated Nov. 1995.*
English machine translation of JP2004-017863, dated Jan. 2004.*

* cited by examiner

*Primary Examiner* — Justin Fischer
*Assistant Examiner* — Robert Dye
(74) *Attorney, Agent, or Firm* — Thorpe North & Western LLP

(57) ABSTRACT

A pneumatic tire including at least four circumferential main grooves extending in the tire circumferential direction and a plurality of rib-like land portions partitioned by the circumferential main grooves in the tread portion. An outer side second land portion includes an L-shaped narrow groove formed by connecting a width direction groove portion extending from an edge portion on an outer side in the tire width direction of the outer side second land portion toward an inner side in the tire width direction, and a circumferential direction groove portion extending substantially parallel to the tire circumferential direction and terminating in an interior portion of the outer side second land portion; and a penetrating sipe penetrating the outer side second land portion in the tire width direction and intersecting the circumferential direction groove portion.

20 Claims, 7 Drawing Sheets

| | Conventional Example | Working Example 1 | Comparative Example | Working Example 2 | Working Example 3 | Working Example 4 | Working Example 5 | Working Example 6 | Working Example 7 | Working Example 8 | Working Example 9 |
|---|---|---|---|---|---|---|---|---|---|---|---|
| L-shaped narrow groove | - | Isolated | Connected | Isolated | Isolated | Isolated | Isolated | Isolated | Isolated | Isolated | Isolated |
| Angle of inclination of width direction groove portion of L-shaped narrow grooves α1 (°) | - | 65 | 65 | 45 | 50 | 80 | 85 | 65 | 65 | 65 | 65 |
| Position of L-shaped narrow grooves D1/W1 (%) | - | 30 | 30 | 30 | 30 | 30 | 30 | 15 | 20 | 40 | 45 |
| Groove width of circumferential direction groove portion of L-shaped narrow grooves W2 (mm) | - | 1.5 | 1.5 | 1.5 | 1.5 | 1.5 | 1.5 | 1.5 | 1.5 | 1.5 | 1.5 |
| Angle of inclination of penetrating sipes β (°) | - | 65 | 65 | 45 | 50 | 80 | 85 | 65 | 65 | 65 | 65 |
| Ratio D3/D2 of lengths of right and left edges of short portion | - | 1.0 | 1.0 | 1.0 | 1.0 | 1.0 | 1.0 | 1.0 | 1.0 | 1.0 | 1.0 |
| Disposal pitch ratio Pg_out/Pg_in | - | 2.0 | 2.0 | 2.0 | 2.0 | 2.0 | 2.0 | 2.0 | 2.0 | 2.0 | 2.0 |
| Sipes of central land portion | - | Present | Present | Present | Present | Present | Present | Present | Present | Present | Present |
| Steering stability performance | 100 | 108 | 108 | 104 | 104 | 108 | 108 | 104 | 108 | 108 | 108 |
| Noise performance | 100 | 105 | 105 | 106 | 106 | 105 | 104 | 105 | 105 | 105 | 105 |
| Wet performance | 100 | 100 | 95 | 99 | 100 | 100 | 101 | 101 | 101 | 99 | 98 |

FIG. 5

| | Conventional Example | Working Example 1 | Working Example 10 | Working Example 11 | Working Example 12 | Working Example 13 | Working Example 14 | Working Example 15 | Working Example 16 | Working Example 17 | Working Example 18 | Working Example 19 |
|---|---|---|---|---|---|---|---|---|---|---|---|---|
| L-shaped narrow groove | - | Isolated | Isolated | Isolated | Isolated | Isolated | Isolated | Isolated | Isolated | Isolated | Isolated | Isolated |
| Angle of inclination of width direction groove portion of L-shaped narrow grooves α1 (°) | - | 65 | 65 | 65 | 65 | 65 | 65 | 65 | 65 | 65 | 65 | 65 |
| Position of L-shaped narrow grooves D1/W1 (%) | - | 30 | 30 | 30 | 30 | 30 | 30 | 30 | 30 | 30 | 30 | 30 |
| Groove width of circumferential direction groove portion of L-shaped narrow grooves W2 (mm) | - | 1.5 | 0.5 | 1.0 | 3.0 | 3.5 | 1.5 | 1.5 | 1.5 | 1.5 | 1.5 | 1.5 |
| Angle of inclination of penetrating sipes β (°) | - | 65 | 65 | 65 | 65 | 65 | 65 | 65 | 65 | 65 | 65 | 65 |
| Ratio D3/D2 of lengths of right and left edges of short portion | - | 1.0 | 1.0 | 1.0 | 1.0 | 1.0 | 0.7 | 0.8 | 1.2 | 1.3 | 1.0 | 1.0 |
| Disposal pitch ratio Pg_out/Pg_in | - | 2.0 | 2.0 | 2.0 | 2.0 | 2.0 | 2.0 | 2.0 | 2.0 | 2.0 | 1.0 | 2.0 |
| Sipes of central land portion | - | Present | Present | Present | Present | Present | Present | Present | Present | Present | Present | None |
| Steering stability performance | 100 | 108 | 108 | 108 | 108 | 104 | 104 | 104 | 108 | 108 | 104 | 108 |
| Noise performance | 100 | 105 | 106 | 106 | 106 | 105 | 106 | 106 | 105 | 104 | 105 | 106 |
| Wet performance | 100 | 100 | 99 | 100 | 100 | 101 | 99 | 100 | 100 | 101 | 103 | 99 |

FIG. 6

CONVENTIONAL EXAMPLE

PNEUMATIC TIRE

PRIORITY CLAIM

Priority is claimed to Japan Patent Application Serial No. 2011-099625 filed on Apr. 27, 2011.

BACKGROUND

1. Technical Field

The present technology relates to a pneumatic tire and particularly relates to a pneumatic tire whereby steering stability performance and noise performance can be enhanced.

2. Related Art

The demand for steering stability performance and noise performance in recent pneumatic tires has been increasing. Conventional pneumatic tires that address this need are described in Japanese Patent No. 4156018.

SUMMARY

The present technology provides a pneumatic tire whereby steering stability performance and noise performance can be enhanced.

A pneumatic tire according to the present technology includes at least four circumferential main grooves extending in a tire circumferential direction, and a plurality of rib-like land portions that are partitioned and formed by the circumferential main grooves in a tread portion. A pair of the circumferential main grooves on an outermost side in the tire width direction are referred to as "shoulder main grooves". Left and right land portions of the land portions partitioned by the shoulder main grooves on the inner side in the tire width direction are referred to as "second land portions". A first of the second land portions is referred to as an "outer side second land portion", and a second of the second land portions is referred to as an "inner side second land portion". The outer side second land portion includes an L-shaped narrow groove formed by connecting a width direction groove portion extending from an edge portion on an outer side in the tire width direction of the outer side second land portion toward the inner side in the tire width direction, and a circumferential direction groove portion extending substantially parallel to the tire circumferential direction and terminating in an interior portion of the outer side second land portion; and a penetrating sipe penetrating the outer side second land portion in the tire width direction and intersecting the circumferential direction groove portion. A plurality of the L-shaped narrow grooves and a plurality of the penetrating sipes are disposed at a predetermined pitch in the tire circumferential direction, and adjacent L-shaped narrow grooves are disposed so as to be mutually isolated.

Additionally, with the pneumatic tire according to the present technology, an angle of inclination $\alpha 1$ with respect to the tire circumferential direction of the width direction groove portion is preferably such that $50° \leq \alpha 1 \leq 80°$.

Additionally, with the pneumatic tire according to the present technology, a width $W1$ of the outer side second land portion and a distance $D1$ from the edge portion on the inner side in the tire width direction of the outer side second land portion to the circumferential direction groove portion are preferably such that $0.20 \leq D1/W1 \leq 0.40$.

Additionally, with the pneumatic tire according to the present technology, a groove width $W2$ of the circumferential direction groove portion is preferably such that $1.0 \text{ mm} \leq W2 \leq 3.0 \text{ mm}$.

Additionally, with the pneumatic tire according to the present technology, an angle of inclination $\beta$ of the penetrating sipes with respect to the tire circumferential direction is preferably such that $50° \leq \beta \leq 80°$.

Additionally, with the pneumatic tire according to the present technology, when a portion of the outer side second land portion surrounded by the circumferential main groove, the L-shaped narrow groove, and the penetrating sipe is referred to as a "short portion", a length $D2$ in the tire circumferential direction of the edge portion of the short portion on the outer side in the tire width direction and a length $D3$ in the tire circumferential direction of an edge portion of the short portion partitioned by the circumferential direction groove portion are preferably such that $0.7 \leq D3/D2 \leq 1.3$.

Additionally, with the pneumatic tire according to the present technology, a pitch $Pg$ of the plurality of L-shaped narrow grooves disposed in the tire circumferential direction and a distance $D4$ from a terminating portion of the circumferential direction groove portion to another adjacent L-shaped narrow groove are preferably such that $0.1 \leq D4/Pg \leq 0.3$.

Additionally, with the pneumatic tire according to the present technology, the inner side second land portion preferably includes an L-shaped narrow groove formed by connecting a width direction groove portion extending from an edge portion on an outer side in the tire width direction of the inner side second land portion toward the inner side in the tire width direction, and a circumferential direction groove portion extending substantially parallel to the tire circumferential direction and terminating in an interior portion of the inner side second land portion; and a penetrating sipe penetrating the inner side second land portion in the tire width direction and intersecting the circumferential direction groove portion. Furthermore, preferably, a plurality of the L-shaped narrow grooves and a plurality of the penetrating sipes are disposed at a predetermined pitch in the tire circumferential direction, and adjacent L-shaped narrow grooves are disposed so as to be mutually isolated.

Additionally, with the pneumatic tire according to the present technology, a disposal pitch $Pg\_out$ of the L-shaped narrow grooves in the outer side second land portion and a disposal pitch $Pg\_in$ of the L-shaped narrow grooves in the inner side second land portion are preferably such that $Pg\_out \geq Pg\_in$.

Additionally, with the pneumatic tire according to the present technology, when a single or a plurality of the land portions between the outer side second land portion and the inner side second land portion is referred to as a "central land portion", at least the central land portion adjacent to the outer side second land portion preferably includes a sipe extending from the edge portion of the outer side second land portion side toward the inner side in the tire width direction along an extended line of the penetrating sipes.

Additionally, with the pneumatic tire according to the present technology, a mounting direction on a vehicle wherein the outer side second land portion is an outer side in a vehicle width direction is preferably designated.

With the pneumatic tire according to the present technology, the outer side second land portion is partitioned into a long portion that is located on the inner side in the tire width direction with respect to the circumferential direction groove portion of the L-shaped narrow grooves, and short portions that are located on the outer side in the tire width direction. Here, when the tire is rotating, collapsing of the short portions in the tire width direction is suppressed due to the long portion that is located on the inner side in the tire width direction supporting the short portions. This leads to the advantage of enhancing of the steering stability performance of the tire. Additionally, because the outer side second land portion is a rib, compared to configurations in which the outer side second land portion is a row of blocks, air pumping noise, impact noise, vibration noise, and the like can be reduced. This leads to the advantage of the noise performance of the tire being enhanced.

BRIEF DESCRIPTION OF THE DRAWINGS

FIG. 5 is a table showing the results of performance testing of pneumatic tires according to the present technology.

FIG. 6 is a table showing the results of performance testing of pneumatic tires according to the present technology.

DETAILED DESCRIPTION

The present technology is explained in detail below with reference to the accompanying drawing. However, the present technology is not limited to this embodiment. Moreover, constituents of the embodiment which can possibly or obviously be substituted while maintaining consistency with the present technology are included. Furthermore, the multiple modified examples described in the embodiment can be combined as desired within the scope apparent to a person skilled in the art.

Pneumatic Tire

Figure 1:
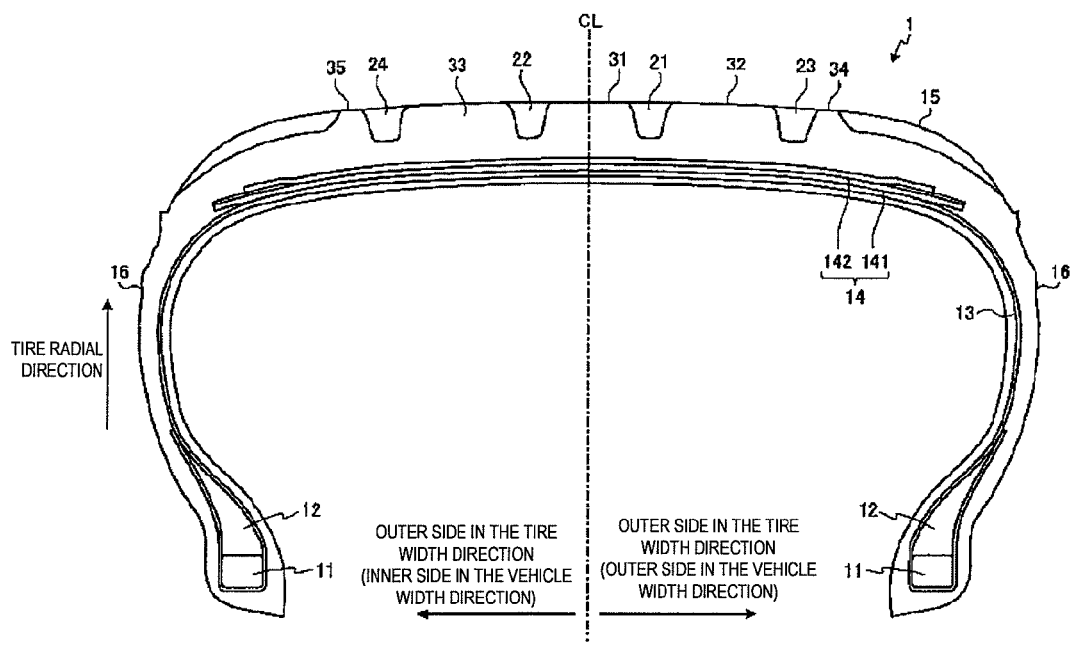
FIG. 1 is a cross-sectional view in a tire meridian direction illustrating a pneumatic tire according to an embodiment of the present technology.
Figure 2:
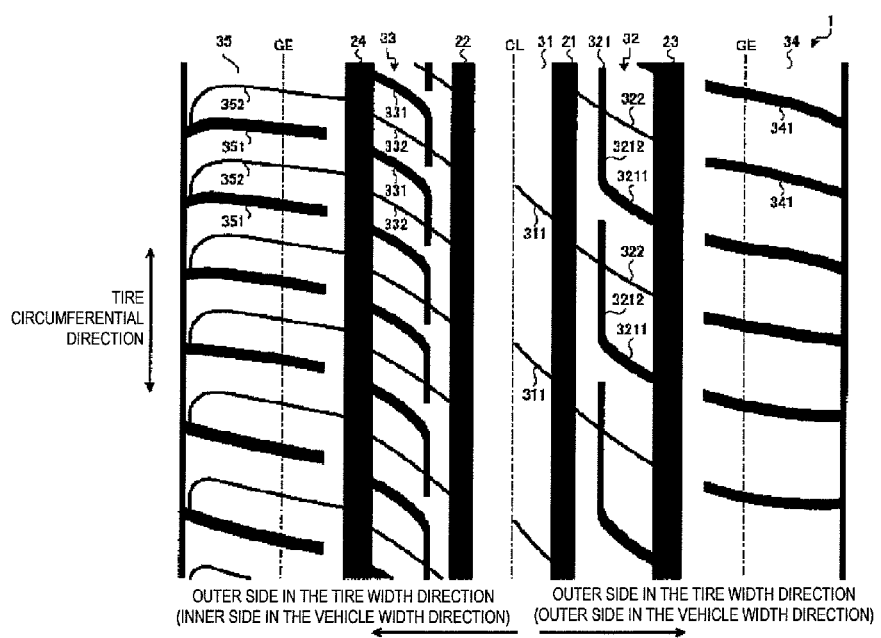
FIG. 2 is a plan view illustrating a tread portion of the pneumatic tire depicted in FIG. 1.

FIG. 1 is a cross-sectional view in a tire meridian direction illustrating a pneumatic tire according to an embodiment of the present technology. FIG. 2 is a plan view illustrating a tread portion of the pneumatic tire depicted in FIG. 1. These drawings depict a summer tire for use on passenger cars that has a rib pattern.

A pneumatic tire 1 includes bead cores 11, bead fillers 12, a carcass layer 13, a belt layer 14, tread rubber 15, and side wall rubber 16 (see FIG. 1). The bead cores 11 have a ring structure, and a pair thereof is provided on left and right sides. The bead fillers 12 are disposed on a periphery of the bead cores 11 in a tire radial direction and reinforce bead portions of the tire. The carcass layer 13 has a single-layer structure, and stretches between the left and right side bead cores 11 and 11 in toroidal form, forming a framework for the tire. Additionally, both ends of the carcass layer 13 are folded toward an outer side in a tire width direction so as to envelop the bead fillers 12, and fixed. The belt layer 14 is formed from a pair of belt plies 141 and 142 that are laminated, and is disposed in the tire radial direction on a periphery of the carcass layer 13. These belt plies 141 and 142 are formed by arranging and roll processing a plurality of belt cords made from steel fiber material or organic fiber material. A crossply structure is achieved by arranging the belt cords so as to incline in mutually different directions in a tire circumferential direction. The tread rubber 15 is disposed on the periphery of the carcass layer 13 and the belt layer 14 in the tire radial direction, and forms a tread portion. The side wall rubber 16 is formed from a pair of left and right sides, is disposed on an outer side in the tire width direction of the carcass layer 13, and forms sidewall portions of the tire.

Additionally, the pneumatic tire 1 includes at least four circumferential main grooves 21 through 24 extending in the tire circumferential direction; and at least one central land portion 31, a pair of second land portions 32 and 33, and a pair of shoulder land portions 34 and 35 partitioned by the circumferential main grooves 21 through 24 in the tread portion (see FIG. 2). Here, the circumferential main grooves 23 and 24 outermost in the tire width direction on the left and right sides of the tire are referred to as "shoulder main grooves." Additionally, the circumferential main grooves 21 and 22 that are inward in tire width direction of these shoulder main grooves 23 and 24 are referred to as "center main grooves." Moreover, of the land portion 32 through 35 partitioned by the shoulder main grooves 23 and 24, the land portion 32 and 33 on the inner side in the tire width direction are referred to as "second land portions," and the land portions 34 and 35 on the outer side in the tire width direction are referred to as "shoulder land portions." Furthermore, the land portion 31 inward in the tire width direction of the second land portions 32 and 33 is referred to as a "central land portion."

Figure 4:
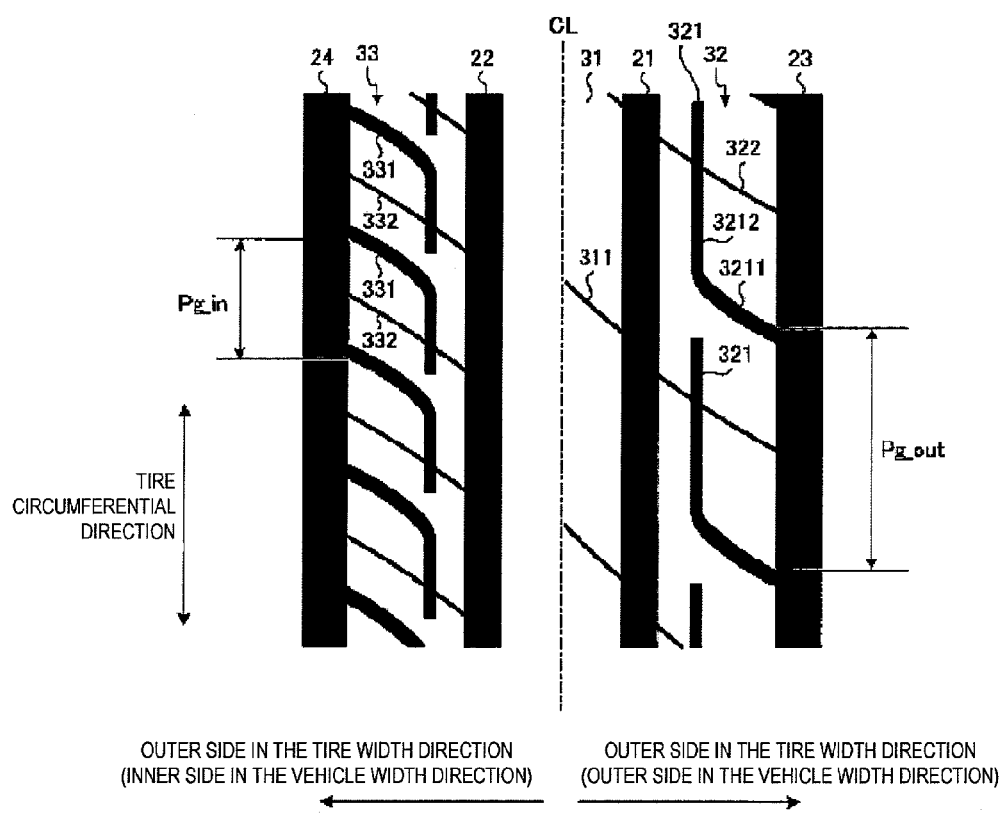
FIG. 4 is an enlarged plan view illustrating a central land portion, the outer side second land portion, and an inner side second land portion of the pneumatic tire depicted in FIG. 2.

For example, in this embodiment, the pneumatic tire 1 has four of the circumferential main grooves 21 through 24 including two of the center main grooves 21 and 22 and two of the shoulder main grooves 23 and 24 (see FIG. 4). Additionally, one central land portion 31, a pair of left and right second land portions 32 and 33, and a pair of left and right shoulder land portions 34 and 35 are partitioned by these circumferential main grooves 21 through 24. Moreover, a tire equator CL is positioned on the central land portion 31 and left and right side tire ground contact edges GE and GE are positioned on the left and right shoulder land portions 34 and 35. Furthermore, these land portions 31 through 35 are ribs, and each does not include a lug groove (a lateral groove having a greater width than that of a sipe) that penetrates in the tire width direction. Therefore, the pneumatic tire 1 has a tread pattern based on ribs (the land portions 31 through 35).

Additionally, in this embodiment, as described above, the pneumatic tire 1 includes two center main grooves 21 and 22, and one central land portion 31 partitioned and formed by the center main grooves 21 and 22. However, the pneumatic tire of the present technology is not limited thereto, and the pneumatic tire 1 may have three or more center main grooves and, thereby, a plurality of central land portions (not illustrated). As a result of disposing the plurality of central land portions 31, a tread width of the tire can be increased.

Additionally, in this embodiment, "circumferential main groove" refers to a circumferential groove having a groove width of not less than 5 mm and not more than 18 mm, and a maximum groove depth of not less than 5 mm and not more than 10 mm. A wear indicator that indicates the useful lifespan of the tire is generally formed in such a circumferential main groove. Additionally, the groove width of the circumferential main groove is a value measured when the tire is assembled on a standard rim, inflated to a prescribed internal pressure, and in an unloaded state.

Note, "standard rim," as used herein, refers to the "Application Rim" defined by JATMA, "Design Rim" defined by TRA, or "Measuring Rim" defined by ETRTO. Additionally "prescribed inner pressure" includes the "maximum air pressure" defined by JATMA, the maximum value in "TIRE LOAD LIMITS AT VARIOUS COLD INFLATION PRESSURES" defined by TRA, or the "INFLATION PRES- SURES" defined by ETRTO. However, in JATMA, for passenger car tires, the prescribed internal pressure is an air pressure of 180 kPa.

Designation of Mounting Direction

The pneumatic tire 1 has a designated mounting direction on a vehicle that is set by providing the tire with a left-right asymmetrical tread pattern that is demarcated by the tire equator CL (see FIG. 2). The designated mounting direction of the tire is generally indicated by recesses and protrusions formed in the side wall portion of the tire.

Here, in a state where the tire is mounted on a vehicle, of the left and right second land portions 32 and 33, the second land portion 32 positioned on an outer side in a vehicle width direction is referred to as the "outer side second land portion" and the second land portion 33 positioned on an inner side in the vehicle width direction is referred to as the "inner side second land portion". Additionally, of the left and right shoulder land portions 34 and 35, the shoulder land portion 34 positioned on the outer side in the vehicle width direction is referred to as the "outer side shoulder land portion" and the shoulder land portion 35 positioned on the inner side in the vehicle width direction is referred to as the "inner side shoulder land portion".

Additionally, in a state where the tire is mounted on a vehicle, of the left and right center main grooves 21 and 22, the center main groove 21 that partitions the central land portion 31 and the outer side second land portion 32 is referred to as the "outer side center main groove" and the center main groove 22 that partitions the central land portion 31 and the inner side second land portion 33 is referred to as the "inner side center main groove". Moreover, of the left and right shoulder main grooves 23 and 24, the shoulder main groove 23 that partitions the outer side second land portion 32 and the outer side shoulder land portion 34 is referred to as the "outer side shoulder main groove" and the shoulder main groove 24 that partitions the inner side second land portion 33 and the inner side shoulder land portion 35 is referred to as the "inner side shoulder main groove".

Outer Side Second Land Portion

Figure 3:
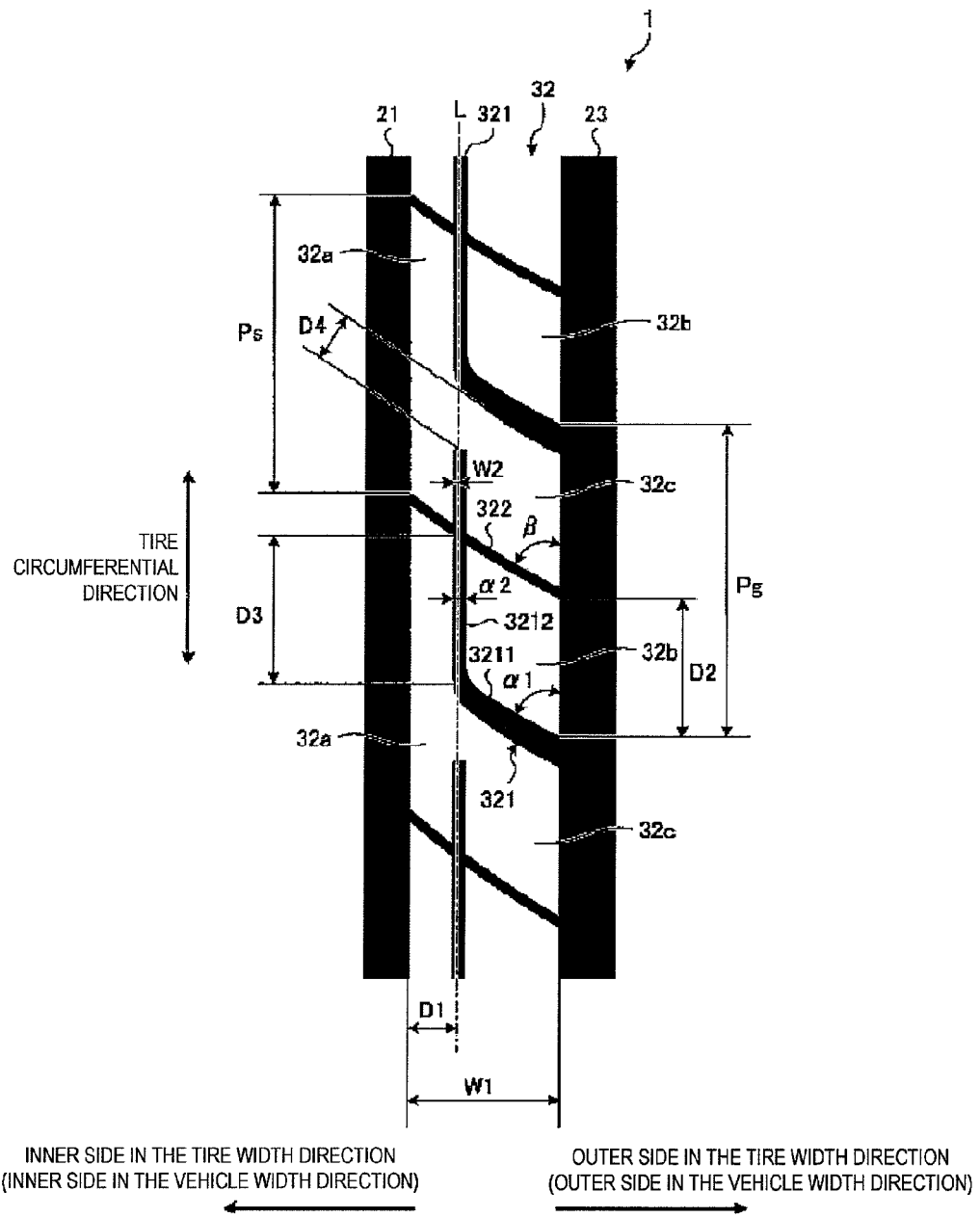
FIG. 3 is an enlarged plan view illustrating an outer side second land portion of the pneumatic tire depicted in FIG. 1.

FIG. 3 is an enlarged plan view illustrating an outer side second land portion of the pneumatic tire depicted in FIG. 1. FIG. 3 illustrates the outer side center main groove 21 and the outer side shoulder main groove 23, and the outer side second land portion 32 partitioned by these main grooves 21 and 23.

The outer side second land portion 32 includes an L-shaped narrow groove 321 and a penetrating sipe 322 (see FIGS. 2 and 3). Moreover, a plurality of the L-shaped narrow grooves 321 and a plurality of the penetrating sipes 322 are disposed at a predetermined pitch in the tire circumferential direction. Furthermore, adjacent L-shaped narrow grooves 321 and 321 are disposed so as to be mutually isolated.

The L-shaped narrow grooves 321 have an L-shape in which a width direction groove portion 3211 extending in the inner side in the tire width direction and a circumferential direction groove portion 3212 extending in the tire circumferential direction are connected (see FIG. 3). Additionally, the L-shaped narrow grooves 321 have a semi-closed structure. Specifically, an end of the width direction groove portion 3211 side of the L-shaped narrow grooves 321 is open at the edge portion on the outer side in the tire width direction of the outer side second land portion 32 and an end of the circumferential direction groove portion 3212 side terminates in an interior portion of the outer side second land portion 32.

Note that in this embodiment, the L-shaped narrow grooves 321 have an L-shape form that is gently curved due to the width direction groove portion 3211 curving in an arcuate manner and being connected to the circumferential direction groove portion 3212 (see FIG. 3). However, the present technology is not limited thereto, and the L-shaped narrow grooves 321 may have a bent L-shape form due to connecting the width direction groove portion 3211 and the circumferential direction groove portion 3212 at an angle (not illustrated).

The width direction groove portion 3211 is a groove portion extending from the edge portion on the outer side in the tire width direction of the outer side second land portion 32 toward the inner side in the tire width direction. Thus, a first end of the width direction groove portion 3211 is open to the outer side shoulder main groove 23 and a second end is connected to the circumferential direction groove portion 3212. Edge components with respect to the tire circumferential direction are formed by the width direction groove portion 3211 described above.

Additionally, the width direction groove portion 3211 is inclined with respect to the tire circumferential direction at an angle of inclinational. Moreover, the angle of inclinational is such that $50° \leq \alpha1 \leq 80°$. Note that in this embodiment, the width direction groove portion 3211 extends from the edge portion on the outer side in the tire width direction of the outer side second land portion 32 toward the inner side in the tire width direction at an angle of inclinational, curves in the tire circumferential direction prior to the circumferential direction groove portion 3212, and is connected to the circumferential direction groove portion 3212.

The circumferential direction groove portion 3212 is a groove portion that extends in the tire circumferential direction and terminates in an interior portion of the outer side second land portion 32. Specifically, a first end of the circumferential direction groove portion 3212 is connected to the width direction groove portion 3211 and a second end terminates in an interior portion of the outer side second land portion 32. The outer side second land portion 32 is partially divided in the tire width direction by the circumferential direction groove portion 3212.

Additionally, the circumferential direction groove portion 3212 extends substantially parallel with the tire circumferential direction (tire equator CL). In other words, portions of the L-shaped narrow grooves 321 that are substantially parallel with the tire circumferential direction are referred to as the "circumferential direction groove portion 3212." Note that cases where the an angle of inclination $\alpha2$ with respect to the tire circumferential direction is such that $-2° \leq \alpha2 \leq 2°$ are considered substantially parallel with the tire circumferential direction.

Additionally, a width W1 of the outer side second land portion 32 and a distance D1 from the edge portion on the inner side in the tire width direction of the outer side second land portion 32 to the circumferential direction groove portion 3212 of the L-shaped narrow grooves 321 are preferably such that $0.20 \leq D1/W1 \leq 0.40$. In other words, the L-shaped narrow grooves 321 are disposed near the edge portion on the inner side in the tire width direction of the outer side second land portion 32. Here, the width W1 and the distance D1 are dimensions of a profile face of the outer side second land portion 32, and are calculated as an average value throughout an entire circumference of the tire. Note that in this embodiment, the outer side second land portion 32 is a linear rib and the width W1 thereof is constant. Additionally, an angle of inclination $\alpha2$ of the circumferential direction groove portion 3212 of the L-shaped narrow grooves 321 is such that $\alpha2=0$ and the distance D1 is constant.

Additionally, a groove width W2 of the circumferential direction groove portion 3212 is preferably such that 0.5 mm≤W2≤3.5 mm and more preferably such that 1.0 mm≤W2≤3.0 mm.

Moreover, a plurality of the L-shaped narrow grooves 321 is disposed at a predetermined pitch Pg in the tire circumferential direction. Here, adjacent L-shaped narrow grooves 321 and 321 are disposed so as not to intersect and be isolated. Additionally, a disposal pitch Pg of the L-shaped narrow grooves 321 and a distance D4 from the terminating portion of the circumferential direction groove portion 3212 to another adjacent L-shaped narrow groove 321 are such that 0.1≤D4/Pg≤0.3. As a result, rigidity of the outer side second land portion 32 is ensured.

The penetrating sipes 322 are sipes that penetrate the outer side second land portion 32 in the tire width direction. The penetrating sipes 322 intersect with the circumferential direction groove portion 3212 of the L-shaped narrow grooves 321 in the outer side second land portion 32. Additionally, the penetrating sipes 322 are disposed between adjacent width direction groove portions 3211 and 3211. Specifically, one penetrating sipe 322 is disposed between adjacent width direction groove portions 3211 and 3211. Moreover, the penetrating sipes 322 have a predetermined disposal pitch with respect to one of the L-shaped narrow grooves 321. Thus, the L-shaped narrow grooves 321 and the penetrating sipes 322 are disposed alternately in the tire circumferential direction at a given disposal pitch.

Additionally, the penetrating sipes 322 are inclined with respect to the tire circumferential direction at an angle of inclination 13. The angle of inclination β is such that 50°≤β≤80°.

Note that "sipe" refers to a cut in the tread surface having a sipe width of not less than 0.3 mm and not more than 1.0 mm. "Sipe width" refers to a value measured when the tire is assembled on a standard rim, inflated to a prescribed internal pressure, and in an unloaded state.

The outer side second land portion 32 has three regions 32a, 32b, and 32c partitioned by the L-shaped narrow groove 321 and the penetrating sipes 322 (see FIG. 3). The regions 32a, 32b, and 32c are broken down into a long portion 32a that is located on the inner side in the tire width direction with respect to the circumferential direction groove portion 3212 of the L-shaped narrow groove 321, and a pair of short portions 32b and 32c that is located on the outer side in the tire width direction. The outer side second land portion 32 is configured with the long portion 32a and the short portions 32b and 32c being consecutively disposed in the tire circumferential direction.

A dimension of the long portion 32a in the tire circumferential direction is substantially equivalent to the disposal pitch Ps of the penetrating sipes 322. Additionally, an average value of a dimension of the long portion 32a in the tire width direction is substantially equivalent to the distance D1 of the circumferential direction groove portion 3212 of the L-shaped narrow grooves 321. Dimensions of the short portions 32b and 32c in the tire circumferential direction are substantially equivalent to the disposal pitch of the width direction groove portion 3211 of the L-shaped narrow grooves 321 and the penetrating sipes 322. In this embodiment, the dimension of the short portion 32b in the tire circumferential direction is constant, and is half of the dimension in the tire circumferential direction of the long portion 32a (Ps/2). Furthermore, an average value of the dimensions of the short portions 32b and 32c in the tire width direction (W1−D1) is larger than that of the long portion 32a because the circumferential direction groove portion 3212 of the L-shaped narrow grooves 321 is disposed near the edge portion on the inner side in the tire width direction. Particularly, in this embodiment, the distance D1 of the circumferential direction groove portion 3212 and the disposal pitch of the width direction groove portion 3211 and the penetrating sipes 322 are adjusted and, as a result, rigidity of the long portion 32a and the short portions 32b and 32c is well balanced.

Additionally, a first of the short portions 32b is partitioned by the outer side shoulder main groove 23, the L-shaped narrow groove 321, and the penetrating sipe 322. Here, the circumferential direction groove portion 3212 of the L-shaped narrow grooves 321 and the outer side shoulder main groove 23 are disposed so as to be substantially parallel, and the width direction groove portion 3211 of the L-shaped narrow grooves 321 and the penetrating sipes 322 are disposed so as to be substantially parallel. Thus, the short portions 32b have a substantially parallelogram shape. Moreover, an angle of a corner of the short portions 32b is defined by the angle of inclinational of the width direction groove portion 3211 and the angle of inclination β of the penetrating sipes 322. Furthermore, with the short portions 32b, a length D2 in the tire circumferential direction of the edge portion on the outer side in the tire width direction and a length D3 in the tire circumferential direction of the edge portion partitioned by the circumferential direction groove portion 3212 are such that 0.7≤D3/D2≤1.3. As a result, the parallelogram shape of the short portions 32b is made appropriate and the rigidity of the short portions 32b is increased.

Additionally, a second of the short portions 32c is partitioned by the outer side shoulder main groove 23, the circumferential direction groove portion 3212 of the L-shaped narrow groove 321, and the penetrating sipe 322. Thus, the short portions 32c also have a substantially parallelogram shape. On the other hand, the short portions 32c are connected to the long portion 32a via the distance D4 between the terminating portions of the L-shaped narrow grooves 321 (the circumferential direction groove portion 3212) and another L-shaped narrow groove 321. As a result, the rigidity of the short portions 32c is increased.

Inner Side Second Land Portion and Central Land Portion

FIG. 4 is an enlarged plan view illustrating a central land portion, the outer side second land portion, and an inner side second land portion of the pneumatic tire depicted in FIG. 2. FIG. 4 illustrates the outer side center main groove 21, the inner side center main groove 22, the outer side shoulder main groove 23, and the inner side shoulder main groove 24; and the central land portion 31, the outer side second land portion 32, and the inner side second land portion 33 partitioned by these main grooves 21 to 24.

The inner side second land portion 33 includes an L-shaped narrow groove 331 and a penetrating sipe 332, the same as the outer side second land portion 32 (see FIGS. 2 and 4). Moreover, a plurality of the L-shaped narrow grooves 331 and a plurality of the penetrating sipes 332 are disposed at a predetermined pitch in the tire circumferential direction. Furthermore, adjacent L-shaped narrow grooves 331 and 331 are disposed so as to be mutually isolated.

The L-shaped narrow grooves 331 are narrow grooves formed by connecting a width direction groove portion extending from an edge portion on an outer side in the tire width direction of the inner side second land portion 33 toward the inner side in the tire width direction, and a circumferential direction groove portion extending substantially parallel to the tire circumferential direction and terminating in an interior portion of the inner side second land portion 33. The penetrating sipes 332 are sipes that penetrate the inner side second land portion 33 in the tire width direction and intersect the circumferential direction groove portion of the L-shaped narrow grooves 331. The L-shaped narrow groove 331 and the penetrating sipe 332 have configurations that are the same as those of the L-shaped narrow groove 321 of the outer side second land portion 32 and the penetrating sipe 322. Therefore, descriptions thereof are omitted.

Here the pneumatic tire 1 has a disposal pitch Pg_out of the L-shaped narrow grooves 321 in the outer side second land portion 32 and a disposal pitch Pg_in of the L-shaped narrow grooves 331 in the inner side second land portion 33 such that Pg_out≥Pg_in (see FIG. 4). In other words, the L-shaped narrow grooves 321 and the penetrating sipes 322 are disposed in the outer side second land portion 32 the same or more sparsely than those disposed in the inner side second land portion 33. As a result, the rigidity of the outer side second land portion 32 is greater than or equal to the rigidity of the inner side second land portion 33.

Additionally, the disposal pitches Pg_out and Pg_in are preferably such that 1.0≤Pg_out/Pg_in≤3.0. For example, in this embodiment, a configuration is provided in which Pg_out/Pg_in=2.0. As a result, a difference in rigidity between the outer side second land portion 32 and the inner side second land portion 33 can be made appropriate.

Note that in this embodiment, orientations of the L-shaped narrow grooves 321 and the penetrating sipes 322 in the outer side second land portion 32, and orientations of the L-shaped narrow grooves 331 and the penetrating sipes 332 in the inner side second land portion 33 are configured so as to be facing mutually opposite directions in the tire circumferential direction (see FIGS. 2 and 4). However, the present technology is not limited thereto and these orientations may be configured so as to be facing the same direction in the tire circumferential direction (not illustrated).

The central land portion 31 includes a plurality of sipes 311 (see FIGS. 2 and 4).

The sipes 311 extend from the edge portion of the outer side second land portion 32 side toward the inner side in the tire width direction along an extended line of the penetrating sipes 322 (see FIG. 4). Additionally, the plurality of sipes 311 is disposed at a predetermined pitch in the tire circumferential direction. For example, in this embodiment, the sipes 311 have a semi-closed structure, extend from the edge portion on the outer side in the tire width direction of the central land portion 31 toward the inner side in the tire width direction, and terminate prior to the tire equator CL. Moreover, the sipes 311 extend along an extended line of the penetrating sipes 322 of the outer side second land portion 32 and are inclined with respect to the tire circumferential direction. Furthermore, the plurality of sipes 311 is disposed in the tire circumferential direction with the same pitch as the penetrating sipes 322 of the outer side second land portion 32.

Note that in this embodiment, the sipes 311 of the central land portion 31 have a semi-closed structure (see FIG. 4). However, the present technology is not limited thereto and the sipes 311 may be open sipes that penetrate the central land portion 31 (not illustrated). Additionally, when disposing a plurality of the central land portions 31, preferably at least the central land portion 31 adjacent to the outer side second land portion 32 includes the sipes 311 described above (not illustrated).

Outer Side Shoulder Land Portion and Inner Side Shoulder Land Portion

The outer side shoulder land portion 34 includes a non-penetrating lug groove 341 (see FIG. 2). The lug groove 341 extends from a tread edge toward the inner side in the tire width direction and terminates at a position beyond the tire ground contact edge GE and prior to the outer side shoulder main groove 23. Additionally a plurality of the lug grooves 341 is disposed at a predetermined pitch in the tire circumferential direction.

The inner side shoulder land portion 35 includes a non-penetrating lug groove 351 and a plurality of sipes 352 (see FIG. 2). The lug groove 351 extends from a tread edge toward the inner side in the tire width direction and terminates at a position beyond the ground contact edge GE and prior to the inner side shoulder main groove 24. Additionally a plurality of the lug grooves 351 is disposed at a predetermined pitch in the tire circumferential direction. The sipes 352 have an open structure that extends from the edge portion on the outer side in the tire width direction of the lug groove 351 toward the inner side in the tire width direction and is open to the inner side shoulder main groove 24. However, the present technology is not limited thereto and the sipes 352 may have a closed or semi-closed structure that is not open to the inner side shoulder main groove 24 (not illustrated).

With the pneumatic tire 1, the outer side shoulder land portion 34 does not include sipes. Therefore, the rigidity of the tread portion in a region on the outer side in the vehicle width direction is ensured. As a result, the steering stability performance of the tire is enhanced. On the other hand, the edge components of the inner side shoulder land portion 35 are increased due to the inner side shoulder land portion 35 including the sipes 352. As a result, the wet performance of the tire is enhanced.

Effects

As described above, the pneumatic tire 1 includes at least four circumferential main grooves 21 through 24 extending in the tire circumferential direction; and a plurality of rib-like land portions 31 to 35 partitioned by the circumferential main grooves 21 through 24 in the tread portion (see FIG. 2). Additionally, the outer side second land portion 32 includes an L-shaped narrow groove 321 formed by connecting a width direction groove portion 3211 extending from an edge portion on an outer side in the tire width direction of the outer side second land portion 32 toward the inner side in the tire width direction, and a circumferential direction groove portion 3212 extending substantially parallel to the tire circumferential direction and terminating in an interior portion of the outer side second land portion 32; and a penetrating sipe 322 penetrating the outer side second land portion 32 in the tire width direction and intersecting the circumferential direction groove portion 3212 (see FIG. 3). Moreover, a plurality of the L-shaped narrow grooves 321 and a plurality of the penetrating sipes 322 are disposed at a predetermined pitch in the tire circumferential direction. Furthermore, adjacent L-shaped narrow grooves 321 and 321 are disposed so as to be mutually isolated.

In such configurations, the outer side second land portion 32 includes portions 32a, 32b, and 32c partitioned by left and right circumferential main grooves 21 and 23, the L-shaped narrow groove 321, and the penetrating sipes 322 (see FIG. 3). The regions 32a, 32b, and 32c are broken down into a long portion 32a that is located on the inner side in the tire width direction with respect to the circumferential direction groove portion 3212 of the L-shaped narrow grooves 321, and short portions 32b and 32c that are located on the outer side in the tire width direction.

Here, when the tire is rotating, a ground contact external force works toward the inner side in the tire width direction. Collapsing of the short portions 32b and 32c in the tire width direction is suppressed due to the long portion 32a that is located on the inner side in the tire width direction supporting the short portions 32b and 32c. This leads to the advantages of footprint characteristics being enhanced and steering stability performance of the tire being enhanced.

Additionally, the outer side second land portion 32 is a rib and does not include a lug groove that penetrates in the tire width direction. Thus, compared to configurations in which the outer side second land portion is a row of blocks (not illustrated), air pumping noise, impact noise, vibration noise, and the like can be reduced. This leads to the advantage of the noise performance of the tire being enhanced.

Furthermore, the outer side second land portion 32 includes the L-shaped narrow grooves 321 and, therefore, the edge components of the tire ground contact patch are ensured by the width direction groove portion 3211 of the L-shaped narrow grooves 321. This configuration leads to the advantage that the wet performance of the tire is ensured. When the vehicle brakes, the short portion 32c connected to the long portion 32a supports the other short portion 32b when ground contact external force in the tire circumferential direction acts on the outer side second land portion 32. This leads to the collapsing in the tire circumferential direction of the short portions 32b being suppressed and the ground contact characteristics of the outer side second land portion 32 being enhanced. This configuration leads to the advantage that the wet performance of the tire is ensured. Additionally, the long portion 32a ensures rigidity in the tire circumferential direction. Therefore, compared to configurations in which an entirety of the outer side second land portion is formed from short portions (not illustrated), wet performance of the tire is ensured.

Additionally, with the pneumatic tire 1, the angle of inclinational with respect to the tire circumferential direction of the width direction groove portion 3211 of the L-shaped narrow grooves 321 is such that $50° \leq \alpha1 \leq 80°$ (see FIG. 3). In such a configuration, the angle of inclinational of the width direction groove portion 3211 is made appropriate and, therefore, the shapes of the short portions 32b and 32c partitioned by the width direction groove portion 3211 are made appropriate. This leads to the advantage of enhancing of the steering stability performance of the tire. For example, if al is less than 50°, the rigidity of the short portions 32b and 32c in the tire circumferential direction and the tire width direction will decline. This is not preferable because it will lead to a decline in the steering stability performance of the tire. Likewise, if al exceeds 80° and approaches 90°, the edges of the short portions 32b and 32c and the ground contact leading and trailing edges will match and impact noise, vibration noise, and air pumping noise when the tire is rotating will increase. This is not preferable because it will lead to a decrease in the noise performance of the tire.

Additionally, with the pneumatic tire 1, a width W1 of the outer side second land portion 32 and a distance D1 from the edge portion on the inner side in the tire width direction of the outer side second land portion 32 to the circumferential direction groove portion 3212 of the L-shaped narrow grooves 321 are such that $0.20 \leq D1/W1 \leq 0.40$ (see FIG. 3). In such a configuration, a position D1/W1 of the circumferential direction groove portion 3212 is made appropriate and, therefore, the balance in the rigidity of the long portion 32a and the short portions 32b and 32c of the outer side second land portion 32 is made appropriate. This leads to the advantages of steering stability performance of the tire being enhanced and wet performance being ensured. For example, if D1/W1<0.20, the width of the long portion will be reduced and the rigidity of the long portion will decline. This is not preferable because it will lead to a decline in steering stability performance. Likewise if 0.40<D1/W1, the width direction groove portion 3211 of the L-shaped narrow grooves 321 will be short and the edge components of the outer side second land portion will be insufficient. This is not preferable because it will lead to a decline in wet performance.

Additionally, with the pneumatic tire 1, a groove width W2 of the circumferential direction groove portion 3212 of the L-shaped narrow grooves 321 is such that $1.0 \text{ mm} \leq W2 \leq 3.0 \text{ mm}$ (see FIG. 3). In such a configuration, the groove width W2 of the circumferential direction groove portion 3212 is made appropriate, and this leads to the advantages of the steering stability performance and the wet performance of the tire being properly ensured. For example, if W2<1.0 mm, the edge components of the circumferential direction groove portion 3212 will be reduced. This is not preferable because it will lead to a decline in wet performance of the tire. Likewise, if 3.0 mm<W2, the rigidity of the outer side second land portion 32 will decline. This is not preferable because it will lead to a decline in steering stability performance of the tire.

Also, in the pneumatic tire 1, the angle of inclination β with respect to the tire circumferential direction of the penetrating sipes 322 is such that $50° \leq \beta \leq 80°$ (see FIG. 3). In such a configuration, the angle of inclination β of the penetrating sipes 322 is made appropriate, therefore the shapes of the short portions 32b and 32c of the outer side second land portion 32 are made appropriate. This leads to the advantages of the rigidity of the short portions 32b and 32c being made appropriate and the steering stability performance of the tire being enhanced. For example, if β is less than 50°, the rigidity of the short portions 32b and 32c in the tire circumferential direction and the tire width direction will decline. This is not preferable because it will lead to a decline in the steering stability performance of the tire. Likewise, if β exceeds 80° and approaches 90°, the ground contact leading and trailing edges of the short portions 32b and 32c will match and impact noise, vibration noise, and air pumping noise when the tire is rotating will increase. This is not preferable because it will lead to a decrease in the noise performance of the tire.

Additionally, with the pneumatic tire 1, a length D2 in the tire circumferential direction of the edge portion on the outer side in the tire width direction of the short portions 32b surrounded by the circumferential main groove 23, the L-shaped narrow groove 321, and the penetrating sipe 322, and a length D3 of the tire circumferential direction in the edge portion of the short portions 32b partitioned by the circumferential direction groove portion 3212 of the L-shaped narrow grooves 321 are such that $0.7 \leq D3/D2 \leq 1.3$ (see FIG. 3). In such a configuration, a ratio D3/D2 of lengths of opposing sides of the short portions 32b is made appropriate and, therefore, the substantially parallelogram shape of the short portions 32b is made appropriate. This leads to the advantages of the rigidity of the short portions 32b being optimized and the steering stability performance of the tire being enhanced. For example, if D3/D2<0.7, the circumferential direction groove portion of the L-shaped narrow grooves will be short, and the short portions 32b will take on a triangular shape. As a result, the rigidity of the short portions 32b in the tire circumferential direction and the tire width direction will decline. This is not preferable because it will lead to a decline in the steering stability performance of the tire. Likewise, if 1.3<D3/D2, the edges of the short portions 32b and the ground contact leading and trailing edges will match and impact noise, vibration noise, and air pumping noise when the tire is rotating will increase. This is not preferable because it will lead to a decrease in the noise performance of the tire.

Additionally, with the pneumatic tire 1, a disposal pitch Pg of the plurality of L-shaped narrow grooves 321 disposed in the tire circumferential direction, and the distance D4 from a terminating portion of the circumferential direction groove portion 3212 of an L-shaped narrow groove 321 to another adjacent L-shaped narrow groove 321 are such that $0.1 \leq D4/Pg \leq 0.3$ (see FIG. 3). In such a configuration, a width (distance D4) of a connecting portion between the long portion 32a and the short portion 32c is made appropriate and, therefore, the rigidity of the outer side second land portion 32 is made appropriate. This leads to the advantage of enhancing of the steering stability performance of the tire. For example, if $D4/Pg<0.1$, the width (distance D4) of the connecting portion between the long portion and the short portion will be short, and collapsing of the short portion 32c will increase. This is not preferable because it will lead to a decline in wet performance of the tire. Additionally, if $0.3<D4/Pg$, the circumferential direction groove portion of the L-shaped narrow grooves will be short. This is not preferable because it will lead to a decline in the uneven wear resistance of the tire.

Additionally, with the pneumatic tire 1, the inner side second land portion 33 includes an L-shaped narrow groove 331 formed by connecting a width direction groove portion extending from an edge portion on the outer side in the tire width direction of the inner side second land portion 33 toward the inner side in the tire width direction, and a circumferential direction groove portion extending substantially parallel to the tire circumferential direction and terminating in an interior portion of the inner side second land portion 33; and a penetrating sipe 332 penetrating the inner side second land portion 33 in the tire width direction and intersecting the circumferential direction groove portion (see FIGS. 2 and 4). Moreover, a plurality of the L-shaped narrow grooves 331 and a plurality of the penetrating sipes 332 are disposed at a predetermined pitch in the tire circumferential direction. Furthermore, adjacent L-shaped narrow grooves 331 and 331 are disposed so as to be mutually isolated. In such a configuration, the inner side second land portion 33 has a configuration that is the same as that of the outer side second land portion 32. This leads to the advantages of the steering stability performance and noise performance of the tire being enhanced while the wet performance of the tire is maintained.

Additionally, the pneumatic tire 1 has a disposal pitch Pg_out of the L-shaped narrow grooves 321 in the outer side second land portion 32 and a disposal pitch Pg_in of the L-shaped narrow grooves 331 in the inner side second land portion 33 such that $Pg\_out \geq Pg\_in$ (see FIG. 4). In such a configuration, the rigidity of the outer side second land portion 32 is greater than or equal to the rigidity of the inner side second land portion 33. Thus, when the pneumatic tire 1 is mounted on a vehicle so that the outer side second land portion 32 is on the outer side in the vehicle width direction, the rigidity of the outer side in the vehicle width direction region, where ground contact external force is greater, is reinforced. This leads to the advantage of enhancing of the steering stability performance of the tire.

Additionally, with the pneumatic tire 1, at least the central land portion 31 adjacent to the outer side second land portion 32 includes the sipes 311 extending from the edge portion of the outer side second land portion 32 side toward the inner side in the tire width direction along an extended line of the penetrating sipes 322 (see FIGS. 2 and 4). Thereby, the edge components of the central land portion 31 are increased, which leads to the advantage of the wet performance of the tire being enhanced.

Additionally, with the pneumatic tire 1, a mounting direction on a vehicle wherein the outer side second land portion 32 is on the outer side in the vehicle width direction is designated (see FIGS. 1 and 2). In such a configuration, when the tire is mounted on the vehicle, the outer side second land portion 32 is disposed on the outer side in the vehicle width direction. This leads to the functionality of each of the land portions 31 through 35 being properly displayed. This leads to the advantages of enhancing of the steering stability performance and the noise performance of the tire, and ensuring the wet performance of the tire.

Working Examples

Figure 7:
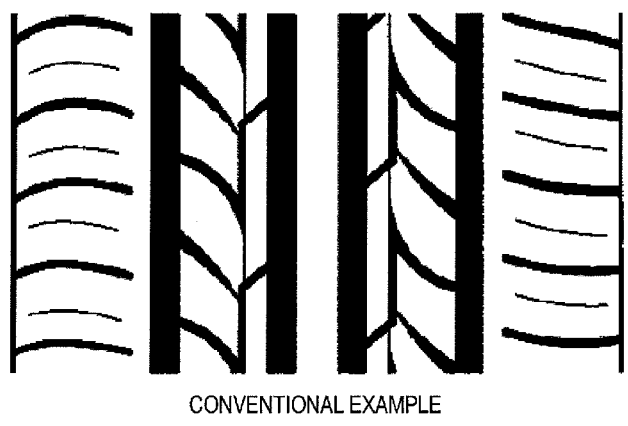
FIG. 7 is a plan view illustrating a tread portion of a pneumatic tire of a Conventional Example.

FIGS. 5 and 6 are tables showing the results of performance testing of pneumatic tires according to the present technology. FIG. 7 is a plan view illustrating a tread portion of a pneumatic tire of a Conventional Example.

In the performance testing, a plurality of mutually differing pneumatic tires were evaluated for (1) steering stability performance, (2) noise performance, and (3) wet performance (see FIGS. 5 and 6). In these performance tests pneumatic tires with a tire size of 205/55R16 91V were assembled on rims with a rim size of 16×6.5JJ and inflated to an air pressure of 200 kPa. Additionally, an FF (front engine-front drive) passenger car with an engine displacement of 1.4 L was used as a test vehicle.

(1) Steering stability performance test: The test vehicle was driven on a dry road test course and the test driver performed sensory evaluations for lane changing performance and cornering performance and the like. Results of the evaluations were indexed and the index value of the pneumatic tire of the Conventional Example was set as the standard score (100). Higher scores were preferable.

(2) Noise performance test: The test vehicle was driven on a dry road test course and the test driver performed a sensory evaluation of in-cabin noise while the test vehicles coasted from a speed of 100 km/h to 20 km/h. Results of the evaluations were indexed and the index value of the pneumatic tire of the Conventional Example was set as the standard score (100). Higher scores were preferable.

(3) Wet performance test: The test vehicle was driven on a wet road test course and braking distance was measured from braking using an Anti-lock braking system (ABS) at an initial speed of 100 km/h. These evaluations were indexed based on the measurement results and the index value of the pneumatic tire of the Conventional Example was set as the standard score (100). In this evaluation, higher scores were preferable.

Note that in these performance tests, pneumatic tires scoring 104 or higher are considered to be superior, and pneumatic tires scoring in a range from 97 to 103 are considered to be equivalent.

The pneumatic tires 1 of Working Examples 1 to 19 included four circumferential main grooves 21 through 24 extending in the tire circumferential direction; and five rib-like land portions 31 through 35 partitioned by the circumferential main grooves 21 through 24 in the tread portion (see FIGS. 2 and 3). Additionally, the outer side second land portion 32 included an L-shaped narrow groove 321 formed by connecting a width direction groove portion 3211 and a circumferential direction groove portion 3212, and a penetrating sipe 322. Moreover, a plurality of the L-shaped narrow grooves 321 and a plurality of the penetrating sipes 322 were disposed at a predetermined pitch in the tire circumferential direction. Furthermore, adjacent L-shaped narrow grooves 321 and 321 were disposed so as to be mutually isolated. An angle of inclination $\alpha 2$ with respect to the tire circumferential direction of the circumferential direction groove portion 3212 was configured such that $\alpha 2=0$. Additionally, a ratio D4/Pg of a pitch Pg of the L-shaped narrow grooves 321 to a distance D4 from the circumferential direction groove portion 3212 to another adjacent L-shaped narrow groove 321 was configured such that D4/Pg=0.16. Particularly, the pneumatic tire 1 of Working Example 1 had the tread pattern depicted in FIG. 2. Additionally, Working Examples 2 to 19 had a tread pattern that is partially modified from the tread pattern depicted in FIG. 2. Moreover, the pneumatic tires 1 of Working Examples 1 to 19 were mounted on the test vehicle so that the outer side second land portion 32 was on the outer side in the vehicle width direction.

The pneumatic tire of the Conventional Example had the tread pattern depicted in FIG. 7. In this Conventional Example, the inner side second rib and the outer side second rib included arrow-shaped narrow grooves.

As is clear from the test results, with the pneumatic tires 1 of Working Examples 1 to 19, compared with the pneumatic tire of the Conventional Example, steering stability performance and noise performance are enhanced and wet performance is maintained (see FIGS. 5 and 6). Additionally, comparing Working Example 1 and the Comparative Example, it is clear that wet performance of the tire is enhanced by disposing the L-shaped narrow grooves 321 such that adjacent L-shaped narrow grooves 321 do not intersect and are mutually isolated. Additionally, comparing Working Examples 1 to 5, it is clear that steering stability performance of the tire is enhanced and wet performance is maintained by making the angle of inclination a1 of the width direction groove portion 3211 and the angle of inclination of the penetrating sipes 322 appropriate. Additionally, comparing Working Examples 1, and 6 to 9, it is clear that steering stability performance of the tire is enhanced and wet performance is maintained by making a ratio D1/W1 of the width W1 of the outer side second land portion 32 to the distance D1 of the circumferential direction groove portion 3212 of the L-shaped narrow grooves 321 appropriate. Additionally, comparing Working Examples 1, and 10 to 13, it is clear that steering stability performance and wet performance of the tire is properly ensured by making the groove width W2 of the circumferential direction groove portion 3212 appropriate. Additionally, comparing Working Examples 1, and 14 to 17, it is clear that steering stability performance of the tire is enhanced by making a ratio D3/D2 of lengths of opposing sides of the short portions 32b appropriate. Additionally, comparing Working Example 1 and Working Example 18, it is clear that steering stability performance of the tire is enhanced by providing a difference in the rigidities of the outer side second land portion 32 and the inner side second land portion 33. Additionally, comparing Working Example 1 and Working Example 19, it is clear that wet performance of the tire is ensured by providing the sipes 311 in the central land portion 31.

What is claimed is:

1. A pneumatic tire comprising: at least four circumferential main grooves extending in a tire circumferential direction, and a plurality of rib-like land portions that are partitioned and formed by the circumferential main grooves in a tread portion, wherein
a pair of the circumferential main grooves on an outermost side in a tire width direction are "shoulder main grooves"; left and right land portions of the land portions partitioned by the shoulder main grooves on an inner side in the tire width direction are "second land portions"; a first of the second land portions is an "outer side second land portion", and a second of the second land portions is an "inner side second land portion",
the outer side second land portion comprises: an L-shaped narrow groove formed by connecting a width direction groove portion extending from an edge portion on an outer side in the tire width direction of the outer side second land portion toward the inner side in the tire width direction, and a circumferential direction groove portion extending substantially parallel to the tire circumferential direction and terminating in an interior portion of the outer side second land portion; and a penetrating sipe extending from a first of the circumferential main grooves to a second of the circumferential main grooves, penetrating the outer side second land portion in the tire width direction and intersecting the circumferential direction groove portion;
a portion of the outer side second land portion surrounded by the circumferential main groove, the L-shaped narrow groove, and the penetrating sipes is referred to as a "short portion",
a length D2 in the tire circumferential direction of the edge portion of the short portion on the outer side in the tire width direction and a length D3 in the tire circumferential direction of an edge portion of the short portion partitioned by the circumferential direction groove portion are such that $0.7 \leq D3/D2 \leq 1.3$; and
a plurality of the L-shaped narrow grooves and a plurality of the penetrating sipes are disposed at a predetermined pitch in the tire circumferential direction, and adjacent L-shaped narrow grooves are disposed so as to be mutually isolated.

2. The pneumatic tire according to claim 1, wherein an angle of inclination a1 with respect to the tire circumferential direction of the width direction groove portion is such that $50° \leq \alpha 1 \leq 80°$.

3. The pneumatic tire according to claim 1, wherein a width W1 of the outer side second land portion and a distance D1 from the edge portion on the inner side in the tire width direction of the outer side second land portion to the circumferential direction groove portion are such that $0.20 \leq D1/W1 \leq 0.40$.

4. The pneumatic tire according to claim 1, wherein a groove width W2 of the circumferential direction groove portion is such that $1.0 \text{ mm} \leq W2 \leq 3.0 \text{ mm}$.

5. The pneumatic tire according to claim 1, wherein an angle of inclination $\beta$ of the penetrating sipes with respect to the tire circumferential direction is such that $50° \leq \beta \leq 80°$.

6. The pneumatic tire according to claim 1, wherein a pitch Pg of the plurality of L-shaped narrow grooves disposed in the tire circumferential direction and a distance D4 from a terminating portion of the circumferential direction groove portion to another adjacent L-shaped narrow groove are such that $0.1 \leq D4/Pg \leq 0.3$.

7. The pneumatic tire according to claim 1, wherein the inner side second land portion comprises: an L-shaped narrow groove formed by connecting a width direction groove portion extending from an edge portion on an outer side in the tire width direction of the inner side second land portion toward the inner side in the tire width direction, and a circumferential direction groove portion extending substantially parallel to the tire circumferential direction and terminating in an interior portion of the inner side second land portion; and a penetrating sipe penetrating the inner side second land portion in the tire width direction and intersecting the circumferential direction groove portion; and
a plurality of the L-shaped narrow grooves and a plurality of the penetrating sipes are disposed at a predetermined pitch in the tire circumferential direction, and adjacent L-shaped narrow grooves are disposed so as to be mutually isolated.

8. The pneumatic tire according to claim 7, wherein a disposal pitch Pg_out of the L-shaped narrow grooves in the outer side second land portion and a disposal pitch Pg_in of the L-shaped narrow grooves in the inner side second land portion are such that Pg_out≥Pg_in.

9. The pneumatic tire according to claim 7, wherein a disposal pitch Pg_out of the L-shaped narrow grooves in the outer side second land portion and a disposal pitch Pg_in of the L-shaped narrow grooves in the inner side second land portion are such that 1.0≤Pg_out/Pg_in≤3.0.

10. The pneumatic tire according to claim 7, wherein orientations of the L-shaped narrow grooves and the penetrating sipes in the outer side second land portion, and orientations of the L-shaped narrow grooves and the penetrating sipes in the inner side second land portion are configured so as to be facing mutually opposite directions in the tire circumferential direction.

11. The pneumatic tire according to claim 7, wherein orientations of the L-shaped narrow grooves and the penetrating sipes in the outer side second land portion, and orientations of the L-shaped narrow grooves and the penetrating sipes in the inner side second land portion are configured so as to be facing a same direction in the tire circumferential direction.

12. The pneumatic tire according to claim 1, wherein a single or a plurality of the land portions between the outer side second land portion and the inner side second land portion is a "central land portion", and
at least the central land portion adjacent to the outer side second land portion comprises a sipe extending from the edge portion of the outer side second land portion side toward the inner side in the tire width direction along an extended line of the penetrating sipes.

13. The pneumatic tire according to claim 1, having a designated mounting direction on a vehicle wherein the outer side second land portion is an outer side in a vehicle width direction.

14. The pneumatic tire according to claim 1, wherein a groove width W2 of the circumferential direction groove portion is such that 0.5 mm≤W2≤3.5 mm.

15. The pneumatic tire according to claim 1, wherein the outer side second land portion is a linear rib and the width W1 thereof is constant, and wherein an angle of inclination α2 of the circumferential direction groove portion of the L-shaped narrow grooves is such that α2=0 and a distance D1 from the edge portion on the inner side in the tire width direction of the outer side second land portion to the circumferential direction groove portion is constant.

16. The pneumatic tire according to claim 1, wherein a single or a plurality of the land portions between the outer side second land portion and the inner side second land portion is a "central land portion", and
at least the central land portion adjacent to the outer side second land portion comprises a sipe with a semi-closed structure extending from the edge portion of the outer side second land portion side toward the inner side in the tire width direction along an extended line of the penetrating sipes.

17. The pneumatic tire according to claim 1, wherein a single or a plurality of the land portions between the outer side second land portion and the inner side second land portion is a "central land portion", and
at least the central land portion adjacent to the outer side second land portion comprises an open sipe penetrating the central land portion and extending from the edge portion of the outer side second land portion side toward the inner side in the tire width direction along an extended line of the penetrating sipes.

18. The pneumatic tire according to claim 1, wherein the pneumatic tire comprises two center main grooves and one central land portion partitioned and formed by the two center main grooves.

19. The pneumatic tire according to claim 1, wherein the L-shaped narrow grooves have an L-shape form that is gently curved due to the width direction groove portion curving in an arcuate manner and being connected to the circumferential direction groove portion.

20. The pneumatic tire according to claim 1, wherein the penetrating sipe intersects the circumferential direction groove portion between ends of the circumferential direction groove portion, and the circumferential direction groove portion extends substantially parallel to the tire circumferential direction along substantially an entire length of the circumferential direction groove portion.

* * * * *